United States Patent
Oswald et al.

(10) Patent No.: US 9,296,379 B2
(45) Date of Patent: Mar. 29, 2016

(54) BRAKING SYSTEMS AND METHODS FOR DETERMINING DYNAMIC BRAKING DATA FOR A BRAKING MODEL FOR A TRAIN

(71) Applicant: WABTEC HOLDING CORP., Wilmerding, PA (US)

(72) Inventors: James A. Oswald, Coggon, IA (US); Dennis W. Sutherland, Marion, IA (US)

(73) Assignee: Wabtec Holding Corp., Wilmerding, PA (US)

( * ) Notice: Subject to any disclaimer, the term of this patent is extended or adjusted under 35 U.S.C. 154(b) by 0 days.

(21) Appl. No.: 14/161,982

(22) Filed: Jan. 23, 2014

(65) Prior Publication Data
US 2014/0343767 A1    Nov. 20, 2014

Related U.S. Application Data

(60) Provisional application No. 61/824,569, filed on May 17, 2013.

(51) Int. Cl.
*G05D 1/00* (2006.01)
*B60T 17/22* (2006.01)
*B60T 8/17* (2006.01)

(52) U.S. Cl.
CPC .......... *B60T 17/228* (2013.01); *B60T 8/1705* (2013.01)

(58) Field of Classification Search
None
See application file for complete search history.

(56) References Cited

U.S. PATENT DOCUMENTS

| 3,731,193 | A | 5/1973 | Darrow |
| 3,921,946 | A | 11/1975 | Norton et al. |
| 4,005,837 | A | 2/1977 | Grundy |
| 4,005,838 | A | 2/1977 | Grundy |
| 4,235,402 | A | 11/1980 | Matty et al. |
| 4,384,695 | A | 5/1983 | Nohmi et al. |
| 4,562,543 | A | 12/1985 | Zuber et al. |
| 5,744,707 | A | 4/1998 | Kull |
| 5,901,819 | A * | 5/1999 | Engle ................. 188/219.1 |
| 6,314,358 | B1 | 11/2001 | Dorn et al. |
| 7,092,801 | B2 | 8/2006 | Kane et al. |
| 8,019,496 | B2 | 9/2011 | Matusiak, Jr. et al. |
| 2007/0142984 | A1 | 6/2007 | Plawecki et al. |
| 2008/0015764 | A1* | 1/2008 | Watanabe ................. 701/72 |
| 2009/0125170 | A1* | 5/2009 | Noffsinger et al. ........ 701/20 |
| 2011/0313671 | A1* | 12/2011 | Nedilko et al. ........... 702/14 |

* cited by examiner

*Primary Examiner* — Adam Alharbi
(74) *Attorney, Agent, or Firm* — The Webb Law Firm

(57) ABSTRACT

Disclosed is a computer-implemented method for determining dynamic braking data for use in a braking model of at least one train, the method including: (a) determining at least one initial safety factor; (b) determining at least one dynamic braking adjustment factor based at least partially on (i) the expected dynamic braking force, and (ii) specified retarding forces of the train; and (c) determining at least one new safety factor based at least partially on the at least one initial safety factor and the at least one dynamic braking adjustment factor. Also disclosed are braking systems including dynamic braking for a train having at least one locomotive.

11 Claims, 3 Drawing Sheets

BRAKING SYSTEMS AND METHODS FOR DETERMINING DYNAMIC BRAKING DATA FOR A BRAKING MODEL FOR A TRAIN

CROSS-REFERENCE TO RELATED APPLICATIONS

This disclosure claims the benefit of U.S. Provisional Application No. 61/824,569, filed May 17, 2013, which is hereby incorporated by reference in its entirety.

BACKGROUND OF THE INVENTION

1. Field of the Invention

The present invention relates generally to train control and braking systems, and in particular to braking systems and methods of determining dynamic braking data and information for use in a braking model or algorithm on an operating train.

2. Description of the Related Art

As is known in the art, trains, which include at least one locomotive and, typically, multiple railcars, employ complex braking systems and arrangements for slowing or stopping the train in variety of conditions and environments. For example, existing braking systems are shown and described in U.S. Publication No. 2007/0142984 and U.S. Pat. Nos. 8,019,496; 6,314,358; 5,744,707; 4,562,543; 4,384,695; 4,235,402; 4,005,838; 4,005,837; 3,921,946; and 3,731,193. Further, many train systems and networks use some form of computer-controlled train management system, such as a Positive Train Control (PTC) system (e.g., the I-ETMS® of Wabtec Corporation). These computer-controlled train management systems have on-board computers or controllers that are used to implement certain train control and management actions for ensuring safe and effective operation of the train.

In addition, the computerized braking control system of the train management system uses a braking model or algorithm to build or determine stopping distances as the train advances or travels through the train network. Such stopping distances are based upon certain specified train-based operating parameters and/or variable feedback from a number of sensor systems and/or ancillary measurements or determinations, e.g., track grade, track curvature, train speed, train weight, brake pipe pressure, braking system reservoir pressures, and the like. Accordingly, the braking model must account for those various parameters, but must also account for variation in the system parameters while providing a stopping distance that has a very low probability of stopping the train past the target location.

As is also known, these stopping distances are used to build a braking profile or curve that estimates or predicts when train will stop, such as at a specified target point or area that is positioned ahead on the track. This braking profile is continually calculated using the braking model and using the changing feedback and variable determinations to provide an updated braking profile or curve ahead of the train. In general, this braking profile or curve visually illustrates to the train operator where the train is predicted to stop if a full-service penalty brake application is initiated. Again, this braking profile or curve is continually (e.g., 1-3 times per second) updated so that the operator has an ongoing understanding of how and when the train would stop during a penalty brake situation.

The braking model or algorithm is initially developed by executing a multitude of scenarios under a wide variety of conditions and states related to all aspects of the train and its projected surrounding environment. Further, and based upon certain rules and/or standards, a safety factor is determined to ensure to a specified probability that the required stopping distance will be safely short of the target. Still further, and during a penalty brake application, the braking model continues to monitor and predict the stopping distance to the specified target location. While a prediction that the train will stop before or at the target location may not pose a significant safety issue, a predicted stop after the target location could prove problematic or unsafe.

In order to provide additional braking capacity and functionality, many trains are equipped with a Dynamic Brake System, which uses the traction motors of a railroad vehicle as generators during the braking process. Specifically, such a Dynamic Brake System provides additional braking force for the train by turning the motors that drive the wheels into generators and transferring the energy into resistors. In the past, and as discussed, the PTC braking model or algorithm has been developed to safely predict the stopping distance and characteristics of a train so that the PTC system can prevent the train from exceeding any speed restrictions or authority limitations. Through years of development, this braking model or algorithm has been refined to achieve accurate results within the requirements for safe operation.

However, one force that has never been properly accounted for is the total dynamic braking forces produced by the locomotive consist. The dynamic braking force has been excluded primarily based on guidance from the Federal Railroad Administration (FRA) and their belief that it could not be safely accounted for or relied upon. The drawback for the railroad operators is that by excluding dynamic braking force, the PTC system becomes too conservative, and may slow down overall throughput on the railroad due to excessive warnings and/or unnecessary enforcements. Therefore, accounting for dynamic braking force in the PTC braking model or algorithm has the potential to improve rail network throughput and reduce nuisance warning and enforcement events to crews that are properly handling their train.

SUMMARY OF THE INVENTION

Generally, provided are braking systems and methods for determining or deriving accurate dynamic braking data for a braking model for a train that address and/or overcome some or all of the above-identified deficiencies and drawbacks associated with existing train braking systems and computer-controlled train management systems. Preferably, provided are braking systems and methods for determining or deriving accurate dynamic braking data for a braking model for a train that provide a more accurate braking model or algorithm for use in a train management system. Preferably, provided are braking systems and methods for determining or deriving accurate dynamic braking data for a braking model for a train that lead to a more productive train management system and improved railroad throughput.

Accordingly, and in one preferred and non-limiting embodiment, provided is a computer-implemented method for determining dynamic braking data for use in a braking model of at least one train. The method includes: (a) determining at least one initial safety factor; (b) determining at least one dynamic braking adjustment factor based at least partially on (i) the expected dynamic braking force, and (ii) specified retarding forces of the train; and (c) determining at least one new safety factor based at least partially on the initial safety factor and the dynamic braking adjustment factor.

In another preferred and non-limiting embodiment, provided is a braking system including dynamic braking for a train having at least one locomotive with at least one on-board computer configured or programmed to: (a) before or during at least one braking event, determine, sense, and/or measure the operating status, performance, available force, and/or condition of at least one of the following: (i) at least one locomotive; (ii) at least one locomotive consist; (iii) at least one component of a dynamic brake system, or any combination thereof; and (b) adjust at least one variable of the on-board braking model based at least partially on the determined, sensed, and/or measured operating status, performance, available force, and/or condition.

In a further preferred and non-limiting embodiment, provided is a braking system including dynamic braking for a train having at least one locomotive with at least one on-board computer configured or programmed to: (a) before or during at least one braking event, determine predicted acceleration or deceleration of the train based at least partially upon an on-board braking model; (b) during the at least one braking event, determine actual train acceleration or deceleration of the train based at least partially upon sensed, measured, and/or calculated operating conditions; and (c) adjust at least one variable of the on-board braking model based at least partially on a specified difference between the predicted acceleration or deceleration and the actual acceleration of deceleration.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

Figure 1:
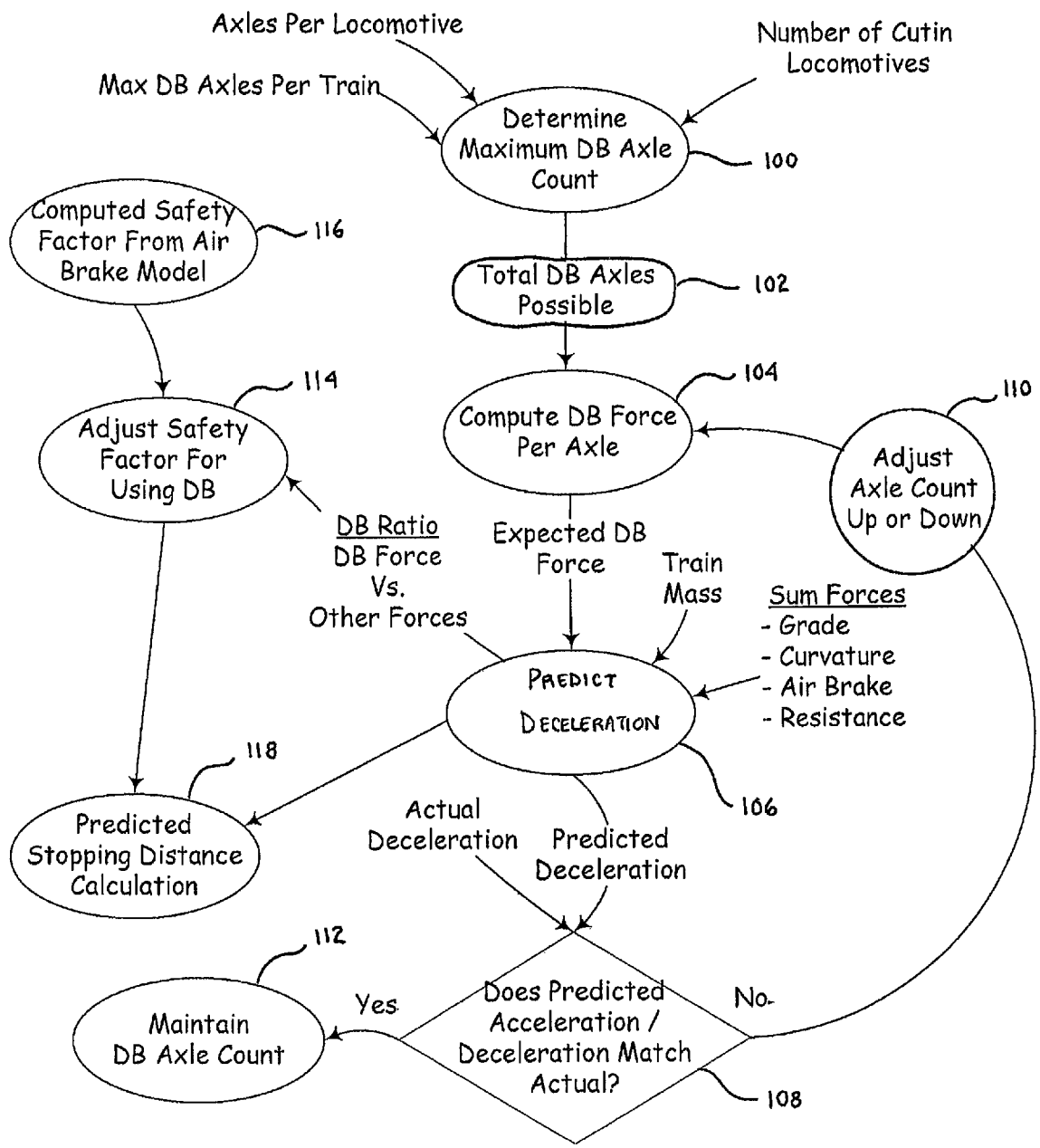
FIG. 1 is a flowchart of one embodiment of a train braking system and method according to the principles of the present invention.

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible. Any known electronic communication protocols and/or algorithms may be used such as, for example, TCP/IP (including HTTP and other protocols), WLAN (including 802.11 and other radio frequency-based protocols and methods), analog transmissions, and/or the like. Further, a variety of wired or wireless network devices may be used, including, but not limited to, a wireless network device, a wired network device, a WiFi network device, a Bluetooth network device, a Zigbee network device, a WirelessHART network device, a GPRS network device, an ultra-wideband network device, a cable network device, a wide-band network device, a multi-radio network device, and the like.

As discussed, a primary issue with utilizing dynamic braking is that the force is not guaranteed to be present throughout a braking event. This force can be limited or non-existent due to mechanical failure, or intentional or unintentional cut-out. Unlike an air brake penalty, the crew could potentially manipulate the dynamic braking force during a penalty stop. Since it is a retarding force, if the braking model or algorithm includes the force, and it is not present or reduced in any way, the braking model or algorithm may not be accurate, which leads to a higher potential to allow a target over-speed or overrun, which negatively impacts the safe performance of the system. Accordingly, the present invention is directed to braking systems and methods of determining dynamic braking data for a braking model for a train, as shown in certain preferred and non-limiting embodiments, and in flowchart and schematic form, in FIGS. 1 and 2.

Dynamic braking force is generated by a dynamic re-wiring of the locomotive traction motors into generators. In such a configuration, the generator would spin freely until connected to a resistive load. When a generator is connected to a load it requires a mechanical force to spin the generator, and this mechanical force is supplied by the moving locomotive. Accordingly, the speed of the locomotive is retarded by this generated force, and the resulting energy is turned into heat in the resistive load. Existing dynamic braking systems and arrangements exhibit several practical and implementation constraints. First, the locomotive must be moving at a minimum speed. Above some maximum speed, there is no practical method of absorbing the energy. For example, a particular locomotive may generate zero dynamic brake force below 3 mph. Between 3 and 10 mph, it might produce from 0 to 10,000 pounds of force per traction motor, based on a linear interpolation. Between 10 and 30 mph the locomotive can produce a relatively constant 10,000 pounds of force per traction motor. From 30 to 40 mph, the force may again be linearly de-rated to 0 pounds. These speed ranges and forces vary by locomotive model. As is known, the engineer has a control that can vary the application ratio of dynamic brakes from 0 to 100%. The "expected dynamic braking force" is therefore a function of the locomotive type, the number of locomotives, the number of traction motors, the current speed, and the current setting of the dynamic brake control handle by the engineer.

As used hereinafter, various terms may be defined or expressed as follows, without limitation. "Total Retarding Forces" may include: (1) Grade Force—The force of gravity acting on the mass of the train going up a hill; (2) Curvature Force—Side wheel friction as the train goes through curves; (3) Aerodynamic Force—The shape and contour of cars and locomotives produce a force as a function of speed; (4) Friction Force—The mechanical friction of the cars and wheel bearings; and (5) Dynamic Brake Force—The forces generated by dynamic brakes.

"Total Axle Count" refers to the sum of all the axles that could produce dynamic brake force. For the purpose of the present invention, and in one preferred and non-limiting embodiment, the total axle count is the product of the number of "Cut-In Locomotives" times the "Axles per Locomotive". In another preferred and non-limiting embodiment, the "Total Axle Count" may be a sum of products. For example, two six-axle locomotives and two four-axle locomotives would be (2*6)+(2*4)=20.

"Cut-in locomotive" refers to a locomotive where the operational controls of the locomotive are set to produce dynamic brake force when requested. The opposite state is a "Cut-out Locomotive," which may physically be in the train, but where electrical problems, mechanical problems, operational policy, and/or railroad rules may result in an operational state for that locomotive to be such that it will be known that it cannot produce a dynamic braking force. "Axle per Locomotive" refers to the axle count on a per-locomotive basis. Most locomotives have one traction motor per axle (although other configurations are possible). Some locomotive manufacturers allow the cut-out of individual traction motors. Other locomotive manufacturers allow the cut-out of all the traction motors on a bogie. As is known, all rail vehicles are limited to 70,000 pounds of weight per axle. If this limit were exceeded, the rail may be crushed. Therefore, if a locomotive weighs 207 tons (414,000 pounds), it must have 414,000/70,000=5.91 axles (6 axles). This number of axles will determine the number of traction motors, and the resulting possibility of producing a dynamic brake force.

"Dynamic Brake Axle Count" refers to the number of axles of dynamic brakes being used in a particular calculation (in time) of dynamic braking effort (or dynamic braking force). The results of the calculation of the acceleration may result in the "Dynamic Brake Axle Count" remaining the same, increasing, or decreasing, as described otherwise herein. "Max Dynamic Axle Count Per Rule" refers to the maximum allowable dynamic axle count. In particular, too much dynamic braking force in a locomotive consist can cause excessive or unsafe in-train car forces to develop. Some newer locomotives can produce more dynamic brake force than their physical axle count would indicate. When assigning a locomotive power consist to a train, a railroad typically takes certain factors into account. Depending on the railroads rating system, a range of from 24 axles to 28 axles is included in a rule for assigning locomotives to a train. For normal extended range dynamic brakes and a railroad with a 24-axle maximum, six four-axle locomotives or 4 six-axle locomotives (or other combinations) would be considered as the maximum allowed number of locomotives to be in the locomotive consist with dynamic brake axles cut-in. New locomotives with six axles of highly effective dynamic brakes can be rated as if they had twelve equivalent axles of normal dynamic brake effort. In this case, two such locomotives would be allowed to have all their dynamic brakes cut in to comply with a 24-axle maximum rule.

"De-rated Axle Count" refers to the dynamic axles that are excluded from the algorithm or determination, as discussed hereinafter. When the acceleration calculation leads to the determination or prediction that too much dynamic brake force is or will be present, one or more axles of dynamic brake is excluded from the determination, and added to the de-rated axle count. Further determinations may maintain, add to, or subtract from the de-rated axle count. "Dynamic Braking Force per Axle" is the expected or determined dynamic braking force on a per-axle basis. The individual traction motor on each axle is the lowest unit of measure for which a dynamic braking force is either available or not available. At this level, the dynamic brake force generated is a function of the original design and speed of the train, i.e., the expected dynamic braking force. At 100% actuation, and in the most effective speed range, 10,000 pounds of dynamic braking force is typical.

"Dynamic Braking Excitation Measurements" refers to the determinations or measurements that relate to dynamic braking excitation. All locomotives in a consist must be engaged in the same operation, as controlled by the locomotive engineer. To facilitate this, and as is known, there is a 27-pin Multiple Unit cable that connects one locomotive to the next. This interconnecting cable and the wiring on each locomotive are collectively called the Train Line (TL). In one embodiment, Train Line 21 controls dynamic brake excitation. The voltage on the TL ranges from 0 to 74 volts. Whatever this voltage is, all of the locomotives respond in a like manner. If the voltage is 0 volts, the engineer's control lever is set to request 0% of the available dynamic brake force. If the voltage is set to 74 volts, the engineer's control lever is set to request 100% of the available dynamic brake force. The voltage on TL 21 is continually sensed to determine the expected percentage of dynamic brake force to use based on the current speed.

The present invention is directed to braking systems and methods for determining dynamic braking data for a braking model for a train. The systems and methods described herein represent computer-implemented systems and methods, and may also be referred to as a model, algorithm, process, method, or the like. Accordingly, and as discussed hereinafter, the computers, servers, and devices represent specially-programmed computers having program instructions adapted to, configured to, programmable to implement, or capable of implementing, the described methods and processes. For example, some or all of the systems or methods described herein may be wholly or partially implemented on or executed by a train management computer of a train, an on-board computer of a train, a remote server, a back office system, or the like.

In a first primary preferred and non-limiting embodiment, the present invention includes a system and method that allows for the safe use of dynamic braking in the braking model or algorithm, and reduction of initial errors in dynamic braking force, by adjusting the safety factor (or offset) in the brake model or algorithm in accordance to the amount of dynamic braking expected. In a second primary preferred and non-limiting embodiment, the present invention includes a system and method that allows for the safe use of dynamic braking in the braking model or algorithm, and reduces the effect of any possible failure of this force, by performing a real-time monitoring of the train behavior to "learn" and adjust the calculated dynamic braking force to an accurate level. This also ensures that safety considerations are being met.

With respect to the first primary preferred and non-limiting embodiment, and since the braking curve is always a calculation into or prediction of the future, the on-board computer or computer, e.g., the train management computer, on-board computer, and the like, cannot determine what might happen to the dynamic braking forces in the future. To account for this, the safety factor can be adjusted to compensate for the risk that the dynamic braking might not be available. In one preferred and non-limiting embodiment, the method includes: (a) determining at least one initial safety factor; (b) determining at least one dynamic braking adjustment factor based at least partially on (i) the expected dynamic braking force, and (ii) specified retarding forces of the train; and (c) determining at least one new safety factor based at least partially on the initial safety factor and the dynamic braking adjustment factor. In another preferred and non-limiting embodiment, the system generates or modifies the braking model or algorithm by incorporating or using the at least one new safety factor, and this braking model or algorithm can be provided to at least one on-board computer of the train. In addition, some or all of the above-discussed steps can be implemented or performed on or by an on-board computer of the train.

In another preferred and non-limiting embodiment, the process, method, or algorithm adjusts the safety factor (or offset) by the ratio of the expected dynamic braking force compared to other retarding forces on the train. The greater the expected dynamic braking force, the greater the safety factor (or offset) that is added. In this embodiment, the initial process, method, or algorithm uses a straight ratio as follows: new safety factor=initial safety factor*(1+(dynamic braking force/total retarding forces). It is envisioned that this process, method, or algorithm or calculation may be modified or otherwise refined within the spirit and scope of the present invention. Although the safety factor is being increased with dynamic brakes present, the overall predicted stopping distance decreases as dynamic brake force is accounted for in the braking model or algorithm.

In the second primary preferred and non-limiting embodiment, and even though the braking curve generated by the braking model or algorithm is mainly a future prediction, it can be made much more accurate by applying real-time behavior measurement to make adjustments to the expected future behavior. As is known, the current brake model or algorithm is based on Newton's first law of motion: F=m*a or a=F/m. The braking model or algorithm is continually computing the expected acceleration or deceleration of the train. If the real-time acceleration or deceleration of the train is monitored and compared against the predicted acceleration or deceleration of the train, then any mechanical failure or cut-out of dynamic brakes can be accounted for. These adjustments can quickly propagate into the future modeling, and thus not be a significant safety risk for operating the train.

Accordingly, in one preferred and non-limiting embodiment, provided is a braking system including dynamic braking for a train having at least one locomotive with at least one on-board computer configured or programmed to: (a) before or during at least one braking event, determine predicted train acceleration or deceleration of the train based at least partially upon an on-board braking model; (b) during the at least one braking event, determine actual train acceleration or deceleration of the train based at least partially upon sensed, measured, and/or calculated operating conditions; and (c) adjust at least one variable of the on-board braking model based at least partially on a specified difference between the predicted train acceleration or deceleration and the actual train acceleration of deceleration. In one preferred and non-limiting embodiment, at least one of steps (a)-(c) is implemented or occurs substantially in real-time. In one embodiment, the variable includes or is in the form of dynamic braking force data.

In another preferred and non-limiting embodiment, the on-board braking model or algorithm is generated based at least partially on a determined retarding force provided by each equipped or applicable axle of the train, and the retarding force is based at least partially on the level of dynamic brake excitation and/or measured dynamic brake energy. In this embodiment, the retarding force is determined based at least partially on determining, sensing, and/or measuring the operating status, performance, available force, and/or condition of at least one of the following: (i) the at least one locomotive; (ii) at least one locomotive consist; (iii) at least one component of a dynamic brake system, or any combination thereof. In addition, the determination of the retarding force can be based at least partially on railroad operating rules and/or cut-out axles.

As discussed, the dynamic braking portion of the braking model or algorithm is based on a retarding force provided by each axle in the locomotive consist. The computed force is based on the level of dynamic braking excitation and/or the dynamic braking energy being measured. It also provides for a maximum number of dynamic braking axles, as determined by railroad operating rules. It further accounts for any known axles that are cut-out, based on consist information. Accordingly, in one preferred and non-limiting embodiment, the dynamic brake-generated retarding force is determined using the following formulae:

> total axle count=(number of cut-in locomotives)*(axles per locomotive)
>
> if (total axle count>max DB axle count per rule) then (total axle count=max axle count)
>
> retarding force=(total axle count−de-rated axle count) *(DB force per axle).

In this embodiment, the dynamic braking portion of the braking model or algorithm initially assumes that the remaining axles are providing dynamic braking force in accordance with dynamic braking excitation measurements. The actual and predicted acceleration or deceleration is then accumulated over a time period (e.g., about 10 seconds), and, optionally, normalized. These normalized readings are then compared. In one preferred and non-limiting embodiment, if the actual acceleration is greater (e.g., 0.5 ft/sec/sec) than the predicted acceleration, one "axle's worth" of force is removed or de-rated for future calculations in the braking model or algorithm. This immediately affects the braking distance by making it slightly or incrementally longer and safer. In this embodiment, the dynamic braking portion of the braking model or algorithm is reset and another average is computed. Again, if the actual acceleration is greater than the predicted acceleration, another axle is removed or de-rated. This process continues or repeats until the predicted and actual accelerations are balanced, or all dynamic braking axles have been removed or de-rated.

In another preferred and non-limiting embodiment, the dynamic braking portion of the braking model or process, method, or algorithm initially assumes a minimal number of axles are providing dynamic braking force in accordance with dynamic braking excitation measurements. The actual and predicted acceleration or deceleration is then accumulated over a time period (e.g., about 10 seconds), and, optionally, normalized. These normalized readings are then compared. In one preferred and non-limiting embodiment, if the actual acceleration is less (e.g., 0.5 ft/sec/sec) than the predicted acceleration, one axle's worth of force is added for future calculations in the braking model or algorithm. This provides for a conservative and safe initial estimate of dynamic braking capability, and then reduces this "conservativeness" by making the predicted stopping distance incrementally shorter, as validated by acceleration. In this embodiment, the dynamic braking portion of the braking model or algorithm is reset and another average is computed. Again, if the actual acceleration is less than the predicted acceleration, another axle is added. This process continues or repeats until either the maximum number of available axles has been reached, or some specified (or conservative) limit below that number has been reached.

In another preferred and non-limiting embodiment, the computer-implemented method or process includes: (a) if the actual train deceleration is less than the predicted train deceleration by a specified amount, the adjustment step (c) comprises: (i) removing one axle's worth of force; or (ii) de-rating one axle's worth of force, in subsequent brake model calculations; or (b) if the actual train deceleration is greater than the predicted train deceleration by a specified amount, the adjustment step (c) comprises at least one of: (i) adding one axle's worth of force; or (ii) rating one axle's worth of force, in subsequent brake model calculations. In addition, step (c) is repeated for the predicted train acceleration or deceleration and the actual train acceleration or deceleration over a subsequent period of time. Upon reducing the difference between the predicted train acceleration or deceleration and the actual train acceleration or deceleration to a specified level, the method and process of this embodiment adjusts the braking model for subsequent braking events. In another preferred and non-limiting embodiment, the above-discussed safety factor is generated by: (a) receiving or determining at least one initial safety factor; (b) receiving or determining at least one dynamic braking adjustment factor based at least partially on (i) the expected dynamic braking force, and (ii) specified retarding forces of the train; and (c) determining at least one new safety factor based at least partially on the initial safety factor and the dynamic braking adjustment factor.

In a still further preferred and non-limiting embodiment, provided is a braking system including dynamic braking for a train having at least one locomotive with at least one on-board computer configured or programmed to: (a) before or during at least one braking event, determine, sense, and/or measure the operating status, performance, available force, and/or condition of at least one of the following: (i) at least one locomotive; (ii) at least one locomotive consist; (iii) at least one component of a dynamic brake system, or any combination thereof; and (b) adjust at least one variable of the on-board braking model based at least partially on the determined, sensed, and/or measured operating status, performance, available force, and/or condition. Accordingly, the system could also make use of other systems on the locomotive that report dynamic brake health and available force in the lead locomotive and trailing locomotives in the consist. This may be implemented using a dynamic brake monitor system, and it provides a basis or platform for communication between locomotives so the engineer can see the dynamic brake system status of the whole locomotive consist.

In another preferred and non-limiting embodiment, (a) if the actual train deceleration is less than the predicted train deceleration by a specified amount, the adjustment step (b) comprises: (i) removing one axle's worth of force; or (ii) de-rating one axle's worth of force, in subsequent brake model calculations; or (b) if the actual train deceleration is greater than the predicted train deceleration by a specified amount, the adjustment step (b) comprises at least one of: (i) adding one axle's worth of force; or (ii) rating one axle's worth of force, in subsequent brake model calculations. This calculation process is then repeated for another period of time, and the process continues repeating until the predicted and actual decelerations are balanced or all dynamic braking axles have been removed or added, or de-rated or rated.

Using these iterative processes, the braking model or algorithm "learns" the actual amount of dynamic braking force on a specified locomotive and/or consist. This learned data and information can now be applied to all future stops involving dynamic braking. Further, this dynamic braking retarding force data can be reset or erased when appropriate, such as when new consist information is provided, or the system has been re-initialized. As discussed the dynamic braking portion of the braking model or algorithm can easily be modified to start with a lesser assumed force, and then add or subtract axles. Further, a safety analysis will help determine the proper approach. It should be noted that these methods and systems may also account for any "phantom" force that may be altering the acceleration or deceleration of the train, even though it is assumed to be a dynamic braking error. Further the variables and constants in the above formulae may be modified or revised without departing from the spirit and scope of the present invention.

In another preferred and non-limiting embodiment, the first and second primary embodiments are combined, and work in conjunction with each other to minimize any "surprises" to the crew. Since the safety factor is based on the amount of expected dynamic braking, as the braking model or algorithm "learns" reduced or varied levels of dynamic braking, the effect is to lengthen the braking curve, but with a decrease in the safety factor (or offset). Thus, the stopping distance presented to the crew is only gradually changing, therefore avoiding sudden or surprise warnings and enforcements. By implementing one or both of these approaches, a significant reduction is provided in the predicted stopping distance of the train on steep downhill grades, where dynamic braking is heavily used. Further, by implementing one or both of these approaches, alignment and/or convergence are improved between the predicted train behavior and actual train behavior. This will improve crew confidence in the system, and improve the railroads overall throughput by avoiding unnecessary enforcements in scenarios where the crew is properly controlling the train.

One preferred and non-limiting embodiment of the present invention is illustrated in FIG. 1. In this embodiment, the system and method of the present invention is implemented for a braking algorithm that includes dynamic braking, and utilizes the real-time train behavior to adjust its calculations. In this embodiment, the safety factor is adjusted based on the dynamic braking level. With reference to FIG. 1, the process begins with a Determination of the Maximum DB Axle Count (Step 100), which determines the maximum available dynamic braking axle count. The Total DB Axles Possible (Step 102) is determined by checking the Number of Cut-in Locomotives, the number of Axles Per Locomotive, as limited by any Maximum DB Axles Per Train limit to the calculation. The Total DB Axles Possible is then provided to a process that limits the total axles by a De-rated Axle Count and then Computes a DB Force Per Axle (Step 104), which is the dynamic braking force per axle that would be generated by each remaining axle, and sums those dynamic braking forces. The result is the Expected DB Force being generated by the train.

Next, the process Predicts Deceleration (Step 106) beginning with the summation of forces, which sums the Expected DB Force and all of the other forces that have been computed and/or are acting upon the train, including, but not limited to Grade Force, Curvature Force, Air Brake Force, and Resistive Forces. Using the summed force and the Train Mass, a Predicted Deceleration is computed. Additionally, during the prediction process, a DB Ratio of the amount of dynamic braking force versus other forces acting on the train is computed for use in determining an appropriate safety factor for the braking distance. After iterating this calculation over time, a Predicted Stopping Distance is determined (as discussed hereinafter).

Next, in Step 108, the Predicted Deceleration is compared with the Actual Deceleration measured for the train. A determination is manually or automatically made (such as through the use of a configurable range or margin) as to how close the Predicted Deceleration and Actual Deceleration are. If the Predicted Deceleration and the Actual Deceleration do not match closely or within the set range or margin, then the De-rated Axle Count is adjusted up or down accordingly (at Step 110). If the Predicted Deceleration is greater than the Actual Deceleration, the De-rated Axle Count is increased by one. If the Predicted Deceleration is less than the Actual Deceleration, the De-rated Axle Count is decreased by one. The new De-rated Axle Count is then fed back for the next iteration of the process, method, or algorithm thereby increasing or decreasing the amount of expected dynamic braking force. If the actual and predicted decelerations match (i.e. are within the range or margin), then the process, method, or algorithm will Maintain the DB Axle Count (Step 112). In parallel with the Predict Deceleration process, the DB Ratio is used to Adjust the Safety Factor for Using DB (Step 114), which will affect the braking distance of the train. The Computed Safety Factor From the Air Brake Model (Step 116) is increased proportionally to the amount of dynamic braking force used in the braking distance calculations. This adjustment is then applied to the Predicted Stopping Distance Calculation (Step 118). It should be noted that the Predicted Deceleration and Actual Deceleration components or variables may be changed to Predicted Acceleration and Actual Acceleration, and the methodology adjusted accordingly.

Figure 2:
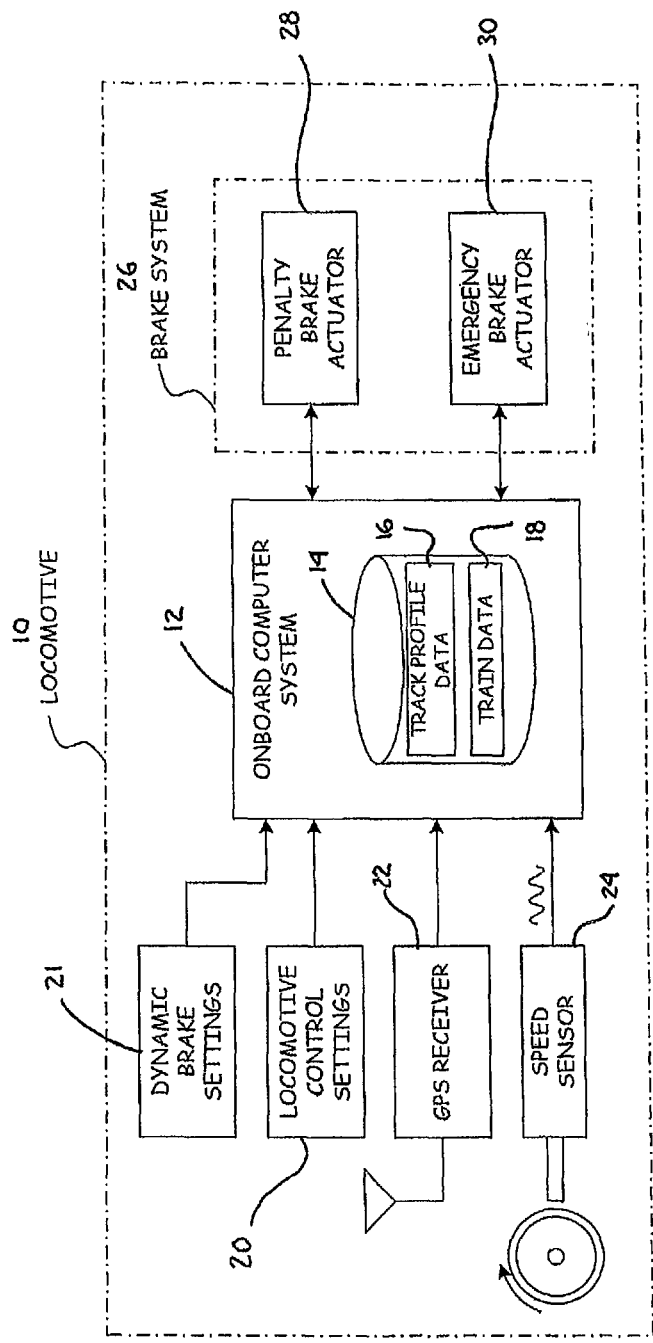
FIG. 2 is a schematic diagram of one embodiment of a train control and braking system according to the principles of the present invention.

The presently-invented system and methods can be implemented in connection with a variety of train types and railroad systems. In one preferred and non-limiting embodiment, and as illustrated in FIG. 2, the systems and methods described herein may be implemented on a train with at least one locomotive 10 having an on-board computer system 12 (e.g., an on-board controller, an on-board computer, a train management computer, and the like). The on-board computer system 12 includes a database 14 populated with track profile data 16 and train data 18, and the on-board computer system 12 also includes the appropriate braking model and other software or programs to effectively implement the systems and methods according to the present invention. In this embodiment, the on-board computer system 12 receives real-time inputs from various locomotive control settings 20, dynamic brake settings 21, a GPS receiver 22, and/or at least one speed sensor 24. The on-board computer system 12 is in communication with, integrated with, or controls the braking system 26, which includes a penalty brake actuator 28 and an emergency brake actuator 30. Accordingly, the presently-invented system and methods can be effectively implemented and used by or on such a locomotive 10 having such an on-board computer system 12 and braking system 26, including a dynamic brake system or dynamic braking functionality. It is envisioned that any type of train management system (or Positive Train Control (PTC) system) and braking system and arrangement can be used within the context and scope of the present invention.

The present invention, including the various computer-implemented and/or computer-designed aspects and configurations, may be implemented on a variety of computing devices and systems, including the client devices and/or server computer, wherein these computing devices include the appropriate processing mechanisms and computer-readable media for storing and executing computer-readable instructions, such as programming instructions, code, and the like. In addition, aspects of this invention may be implemented on existing controllers, control systems, and computers integrated or associated with, or positioned on, the locomotives. For example, the presently-invented system or any of its functional components can be implemented wholly or partially on a train management computer, a Positive Train Control (PTC) computer, an on-board controller or computer, a railcar computer, and the like. In addition, certain aspects of the presently-invented systems and methods may be implemented in a laboratory environment in one or more computers or servers. Still further, the functions and computer-implemented features of the present invention may be in the form of software, firmware, hardware, programmed control systems, microprocessors, and the like.

Figure 3:
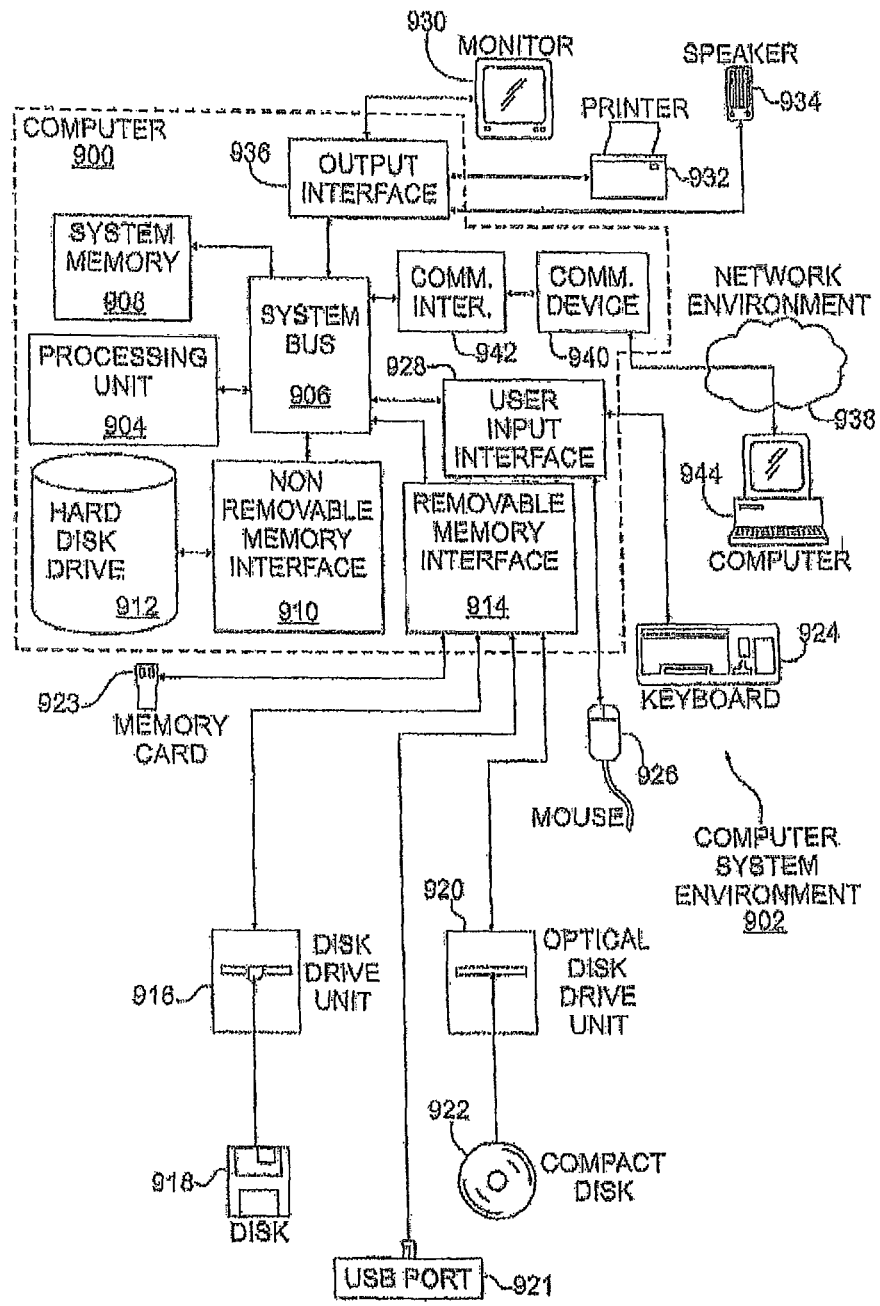
FIG. 3 is a schematic diagram of a computer and network infrastructure according to the prior art.

As shown in FIG. 3, computers 900, 944, in a computing system environment 902 are provided. This computing system environment 902 may include, but is not limited to, at least one computer 900 having certain components for appropriate operation, execution of code, and creation and communication of data. For example, the computer 900 includes a processing unit 904 (typically referred to as a central processing unit or CPU) that serves to execute computer-based instructions received in the appropriate data form and format. Further, this processing unit 904 may be in the form of multiple processors executing code in series, in parallel, or in any other manner for appropriate implementation of the computer-based instructions.

In order to facilitate appropriate data communication and processing information between the various components of the computer 900, a system bus 906 is utilized. The system bus 906 may be any of several types of bus structures, including a memory bus or memory controller, a peripheral bus, or a local bus using any of a variety of bus architectures. In particular, the system bus 906 facilitates data and information communication between the various components (whether internal or external to the computer 900) through a variety of interfaces, as discussed hereinafter.

The computer 900 may include a variety of discrete computer-readable media components. For example, this computer-readable media may include any media that can be accessed by the computer 900, such as volatile media, non-volatile media, removable media, non-removable media, etc. As a further example, this computer-readable media may include computer storage media, such as media implemented in any method or technology for storage of information, such as computer-readable instructions, data structures, program modules, or other data, random access memory (RAM), read only memory (ROM), electrically erasable programmable read only memory (EEPROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 900. Further, this computer-readable media may include communications media, such as computer-readable instructions, data structures, program modules, or other data in other transport mechanisms and include any information delivery media, wired media (such as a wired network and a direct-wired connection), and wireless media. Computer-readable media may include all machine-readable media with the sole exception of transitory, propagating signals. Of course, combinations of any of the above should also be included within the scope of computer-readable media.

As seen in FIG. 3, the computer 900 further includes a system memory 908 with computer storage media in the form of volatile and non-volatile memory, such as ROM and RAM. A basic input/output system (BIOS) with appropriate computer-based routines assists in transferring information between components within the computer 900 and is normally stored in ROM. The RAM portion of the system memory 908 typically contains data and program modules that are immediately accessible to or presently being operated on by processing unit 904, e.g., an operating system, application programming interfaces, application programs, program modules, program data and other instruction-based computer-readable codes.

With continued reference to FIG. 3, the computer 900 may also include other removable or non-removable, volatile or non-volatile computer storage media products. For example, the computer 900 may include a non-removable memory interface 910 that communicates with and controls a hard disk drive 912, i.e., a non-removable, non-volatile magnetic medium; and a removable, non-volatile memory interface 914 that communicates with and controls a magnetic disk drive unit 916 (which reads from and writes to a removable, non-volatile magnetic disk 918), an optical disk drive unit 920 (which reads from and writes to a removable, non-volatile optical disk 922, such as a CD ROM), a Universal Serial Bus (USB) port 921 for use in connection with a removable memory card, etc. However, it is envisioned that other removable or non-removable, volatile or non-volatile computer storage media can be used in the exemplary computing system environment 900, including, but not limited to, magnetic tape cassettes, DVDs, digital video tape, solid state RAM, solid state ROM, etc. These various removable or non-removable, volatile or non-volatile magnetic media are in communication with the processing unit 904 and other components of the computer 900 via the system bus 906. The drives and their associated computer storage media discussed above and illustrated in FIG. 3 provide storage of operating systems, computer-readable instructions, application programs, data structures, program modules, program data and other instruction-based computer-readable code for the computer 900 (whether duplicative or not of this information and data in the system memory 908).

A user may enter commands, information, and data into the computer 900 through certain attachable or operable input devices, such as a keyboard 924, a mouse 926, etc., via a user input interface 928. Of course, a variety of such input devices may be utilized, e.g., a microphone, a trackball, a joystick, a touchpad, a touch-screen, a scanner, etc., including any arrangement that facilitates the input of data, and information to the computer 900 from an outside source. As discussed, these and other input devices are often connected to the processing unit 904 through the user input interface 928 coupled to the system bus 906, but may be connected by other interface and bus structures, such as a parallel port, game port, or a universal serial bus (USB). Still further, data and information can be presented or provided to a user in an intelligible form or format through certain output devices, such as a monitor 930 (to visually display this information and data in electronic form), a printer 932 (to physically display this information and data in print form), a speaker 934 (to audibly present this information and data in audible form), etc. All of these devices are in communication with the computer 900 through an output interface 936 coupled to the system bus 906. It is envisioned that any such peripheral output devices be used to provide information and data to the user.

The computer 900 may operate in a network environment 938 through the use of a communications device 940, which is integral to the computer or remote therefrom. This communications device 940 is operable by and in communication to the other components of the computer 900 through a communications interface 942. Using such an arrangement, the computer 900 may connect with or otherwise communicate with one or more remote computers, such as a remote computer 944, which may be a personal computer, a server, a router, a network personal computer, a peer device, or other common network nodes, and typically includes many or all of the components described above in connection with the computer 900. Using appropriate communication devices 940, e.g., a modem, a network interface or adapter, etc., the computer 900 may operate within and communication through a local area network (LAN) and a wide area network (WAN), but may also include other networks such as a virtual private network (VPN), an office network, an enterprise network, an intranet, the Internet, etc. It will be appreciated that the network connections shown are exemplary and other means of establishing a communications link between the computers 900, 944 may be used.

As used herein, the computer 900 includes or is operable to execute appropriate custom-designed or conventional software to perform and implement the processing steps of the method and system of the present invention, thereby, forming a specialized and particular computing system. Accordingly, the presently-invented method and system may include one or more computers 900 or similar computing devices having a computer-readable storage medium capable of storing computer-readable program code or instructions that cause the processing unit 902 to execute, configure or otherwise implement the methods, processes, and transformational data manipulations discussed hereinafter in connection with the present invention. Still further, the computer 900 may be in the form of a personal computer, a personal digital assistant, a portable computer, a laptop, a palmtop, a mobile device, a mobile telephone, a server, or any other type of computing device having the necessary processing hardware to appropriately process data to effectively implement the presently-invented computer-implemented method and system.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A braking system including dynamic braking for a train having at least one locomotive with at least one on-board computer configured or programmed to:
    (a) before or during at least one braking event, determine predicted acceleration or deceleration of the train based at least partially upon an on-board braking model;
    (b) during the at least one braking event, determine actual train acceleration or deceleration of the train based at least partially upon sensed, measured, and/or calculated operating conditions; and (c) adjust at least one variable of the on-board braking model based at least partially on a specified difference between the predicted acceleration or deceleration and the actual acceleration or deceleration, wherein the on-board braking model is generated or modified based at least partially on a determined retarding force provided by each equipped or applicable axle of the train, and wherein the at least one on-board computer is further configured or programmed to determine the retarding force based at least partially on determining, sensing, and/or measuring the operating status, performance, available force, and/or condition of at least one of the following: (i) the at least one locomotive; (ii) at least one locomotive consist; (iii) at least one component of a dynamic brake system, or any combination thereof.

2. The braking sytem of claim 1, wherein at least one of steps (a)-(c) is implemented or occurs substantially in real-time.

3. The braking system of claim 1, further comprising determining the retarding force based at least partially on the level of dynamic brake excitation and/or measured dynamic brake energy.

4. The braking system of claim 1, further comprising determining retarding force based at least partially on railroad operating rules and/or cut-out axles.

5. A braking system including dynamic braking for a train having at least one locomotive with at least one on-board computer configured or programmed to:
(a) before or during at least one braking event, determine predicted acceleration or deceleration of the train based at least partially upon an on-board braking model;
(b) during the at least one braking event, determine actual train acceleration or deceleration of the train based at least partially upon sensed, measured, and/or calculated operating conditions; and
(c) adjust at least one variable of the on-board braking model based at least partially on a specified difference between the predicted acceleration or deceleration and the actual acceleration or deceleration,
wherein the on-board braking model is generated or modified based at least partially on a determined retarding force provided by each equipped or applicable axle of the train,
wherein dynamic brake-generated retarding force is determined using the following formulae:

total axle count=(number of cut-in locomotives)*(axles per locomotive)

if (total axle count>max DB axle count per rule) then (total axle count=max axle count)

retarding force=(total axle count−de-rated axle count) *(DB force per axle).

6. The braking system of claim 1, further comprising accumulating or analyzing the predicted train acceleration or deceleration and the actual train acceleration or deceleration over a period of time, and optionally, normalizing the accumulated data.

7. A braking system including dynamic braking for a train having at least one locomotive with at least one on-board computer configured or programmed to:
(a) before or during at least one braking event, determine predicted acceleration or deceleration of the train based at least partially upon an on-board braking model;
(b) during the at least one braking event, determine actual train acceleration or deceleration of the train based at least artially upon sensed, measured, and/or calculated operating conditions; and
(c) adjust at least one variable of the on-board braking model based at least partially on a specified difference between the predicted acceleration or deceleration and the actual acceleration or deceleration,
wherein the on-board braking model is generated or modified based at least partially on a determined retarding force provided by each equipped or applicable axle of the train,
wherein:
(a) if the actual train deceleration is less than the predicted train deceleration by a specified amount, the adjustment step (c) comprises: (i) removing one axle's worth of force; or
(ii) de-rating one axle's worth of force, in subsequent brake model calculations; or
(b) if the actual train deceleration is greater than the predicted train deceleration by a specified amount, the adjustment step (b) comprises at least one of: (i) adding one axle's worth of force; or (ii) rating one axle's worth of force, in subsequent brake model calculations.

8. The braking system of claim 7, further comprising repeating adjustment step (b) for the predicted train acceleration or deceleration and the actual train acceleration or deceleration over a subsequent period of time.

9. The braking system of claim 8, wherein, upon reducing the difference between the predicted train acceleration or deceleration and the actual train acceleration or deceleration to a specified level, adjusting the braking model for subsequent braking events.

10. The braking system of claim 1, wherein at least one safety factor of the on-board braking model is generated by:
(a) receiving or determining at least one initial safety factor;
(b) receiving or determining at least one dynamic braking adjustment factor based at least partially on (i) the expected dynamic braking force, and (ii) specified retarding forces of the train; and
(c) determining at least one new safety factor based at least partially on the initial safety factor and the dynamic braking adjustment factor.

11. The braking system of claim 1, wherein the at least one variable comprises dynamic braking force data.

* * * * *